(12) United States Patent
Nozoe et al.

(10) Patent No.: US 11,860,405 B2
(45) Date of Patent: Jan. 2, 2024

(54) HOLE ASSISTED OPTICAL FIBER

(71) Applicant: NIPPON TELEGRAPH AND TELEPHONE CORPORATION, Tokyo (JP)

(72) Inventors: Saki Nozoe, Musashino (JP); Nobutomo Hanzawa, Musashino (JP); Yuto Sagae, Musashino (JP); Kazuhide Nakajima, Musashino (JP); Kyozo Tsujikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 6 days.

(21) Appl. No.: 17/641,061

(22) PCT Filed: Sep. 18, 2019

(86) PCT No.: PCT/JP2019/036629
§ 371 (c)(1),
(2) Date: Mar. 7, 2022

(87) PCT Pub. No.: WO2021/053766
PCT Pub. Date: Mar. 25, 2021

(65) Prior Publication Data
US 2022/0334307 A1 Oct. 20, 2022

(51) Int. Cl.
*G02B 6/02* (2006.01)
*G02B 6/032* (2006.01)
*G02B 6/036* (2006.01)

(52) U.S. Cl.
CPC ..... *G02B 6/02347* (2013.01); *G02B 6/02361* (2013.01); *G02B 6/02366* (2013.01); *G02B 6/032* (2013.01); *G02B 6/036* (2013.01)

(58) Field of Classification Search
CPC ............ G02B 6/02347; G02B 6/02361; G02B 6/02366; G02B 6/032; G02B 6/02333;
(Continued)

(56) References Cited

U.S. PATENT DOCUMENTS

2013/0089112 A1\* 4/2013 Dong ................ G02B 6/02357
385/125
2013/0136409 A1 5/2013 Kumano et al.

FOREIGN PATENT DOCUMENTS

EP 2469314 A1 \* 6/2012 ......... G02B 6/02019
JP 2012037782 A 2/2012

OTHER PUBLICATIONS

J. C. Knight et al., All-silica single-mode optical fiber with photonic crystal cladding, Optics Letters, vol. 21, No. 19, 1996, pp. 1547-1549.
(Continued)

*Primary Examiner* — Michelle R Connelly
(74) *Attorney, Agent, or Firm* — Harness, Dickey & Pierce, P.L.C.

(57) ABSTRACT

An object of the present invention is to provide an HAF having a structure in which the number of air holes is decreased to be smaller than that of a PCF and Rayleigh scattering loss may be more reduced than that in the existing HAF. The HAF according to the present invention includes a core portion having a uniform optical refractive index; a cladding portion having a uniform optical refractive index and surrounding the core portion; and a plurality of air holes arranged in two layers at positions configuring hexagonal closest packing excluding the core portion within the cladding portion along a longitudinal direction of the hole-assisted fiber, wherein a center-to-center spacing of the air holes is a sum of a radius Rin of an inscribed circle inscribed in the air holes in an inner layer and a radius d/2 of the air hole, and a radius "a" of the core portion and a relative
(Continued)

refractive index difference Δ between the core portion and the cladding portion are present within a range where Rn, which is a ratio of a Rayleigh scattering coefficient Rsmf of a single mode optical fiber and an effective Rayleigh scattering coefficient Reff of the hole-assisted fiber, is equal to or less than 0.92.

3 Claims, 6 Drawing Sheets

(58) Field of Classification Search
CPC  G02B 6/02342; G02B 6/02314; G02B 6/036; C03B 2203/42
See application file for complete search history.

(56) References Cited

OTHER PUBLICATIONS

Lin Ma et al., Loss reduction in few-mode photonic crystal fiber by reducing inner surface imperfections in air holes, Optics Express, vol. 23, No. 10, 2015, pp. 13619-13625.
Lin Ma et al., Design and Fabrication of Low Loss Hole-Assisted Few-Mode Fibers With Consideration of Surface Imperfection of Air Holes, Journal of Lightwave Technology, vol. 34, No. 22, 2016, pp. 5164-5169.
K. Tsujikawa et al., Scattering property of F and Ge02 codoped silica glasses, Electronics Letters, vol. 30, No. 4, 1994, pp. 351-352.
Kazuhide Nakajima et al., Bending-Loss Insensitive Fiber with Hole-Assisted Structure, IEICE Transactions on Communications, vol. E94-B, No. 3, 2011.

* cited by examiner

HOLE ASSISTED OPTICAL FIBER

CROSS-REFERENCE TO RELATED APPLICATIONS

This application is a 371 U.S. National Phase of International Application No. PCT/JP2019/036629, filed on Sep. 18, 2019. The entire disclosure of the above application is incorporated herein by reference.

TECHNICAL FIELD

The present disclosure relates to hole-assisted fibers.

BACKGROUND ART

In recent years, traffic in optical fiber networks has increased, and the increase of transmission capacity has been achieved by employing various approaches such as increasing transmission speeds, increasing the number of multiplexed wavelengths by the wavelength division multiplexing (WDM) technique, and using multi-level modulation. However, since the increase of transmission capacity using already-existing transmission lines and existing transmission schemes is expected to be difficult in the future, extension of wavelength regions, new transmission fibers, and new transmission schemes have been studied.

As a method for extending a wavelength region, a study has also been carried out to achieve WDM of a wide wavelength region by utilizing a wavelength band that is not currently utilized so as to increase the transmission capacity. However, since transmission loss differs depending on wavelength bands, the wavelength bands that can be used are limited, in addition, because optical amplifiers capable of amplification across a wide wavelength region are also difficult to achieve, there are many problems to solve in order to put WDM of a wide wavelength region to practical use.

On the other hand, regarding anew transmission fiber structure, a photonic crystal fiber (PCF) configured to operate in a single mode in a wide wavelength region is proposed (for example, see Non Patent Literature (NPL) 1).

CITATION LIST

Non Patent Literature

NPL 1: J. C. Knight, T. A. Birks. P. ST. J. Russell, and D. M. Atkin, "All-silica single-mode optical fiber with photonic crystal cladding," Opt. Lett. 21, 1547-1549 (1996).

NPL 2: Lin Ma, Nobutomo Hanzawa, Kyozo Tsujikawa, Shinichi Aozasa, and Fumihiko Yamamoto, "Loss reduction in few-mode photonic crystal fiber by reducing inner surface imperfections in air holes," Opt. Express 23, 13619-13625 (2015).

NPL 3: L. Ma, K. Tsujikawa, N. Hanzawa, S. Aozasa, S. Nozoe and F. Yamamoto, "Design and Fabrication of Low Loss Hole-Assisted Few-Mode Fibers With Consideration of Surface Imperfection of Air Holes," in Journal of Lightwave Technology, vol. 34, no. 22, pp. 5164-5169, 15 Nov. 15, 2016.

NPL 4: K. Tsujikawa, M. Ohashi, K. Shiraki, M. Tateda, "Scattering property of F and GeO2 codoped silica glasses," Electronics Letters, 30, (4), p. 351-352, 1994.

NPL 5: K. Nakajima. T. Shimizu, T. Matsui, C. Fukai and T. Kurashima, "Bending-Loss Insensitive Fiber with Hole-Assisted Structure," IEICE TRANS. COMMUN., E94-B. NO. 3, 2011.

SUMMARY OF THE INVENTION

Technical Problem

The PCF is made of a uniform material (generally pure quartz glass) and confines light by a refractive index difference between a cladding portion formed with air holes and a core portion, and therefore the PCF requires a significantly large number of air holes as compared to a hole-assisted fiber (HAF) or the like having a quartz glass core doped with GeO2. The number of air holes is about four to ten in the case of the HAF whose air hole structure takes a single layer structure, but at least 36 air holes are needed in the case of the PCF (see NPL 2).

Since the HAF has a core with a high refractive index, the exudation of light into the air hole is small in quantity; in contrast, since the PCF has a property that light is confined only by the air hole structure, the exudation of light into the air hole is large in quantity. As a result, impurities entering into an inner surface of the air hole, unevenness generated during processing, or the like is likely to cause an increase of loss.

In general, a parent material of an optical fiber of an air hole structure type such as the PCF is produced by mainly two methods including (i) a capillary method and (ii) a drilling method using a drill.

(i) Capillary Method

In this method, hollow thin-diameter glass tubes (capillaries) of the number equal to the number of air holes in the PCF are bundled and filled in a form of a closest-packed structure into a jacket glass tube, whose inside is hollowed out in a columnar shape. This method has a problem of unwanted gaps being likely to be generated during manufacturing. The gaps increase in number as the number of air holes increase, which may cause an air hole position shift or deformation during fiber forming. Thus, this method raises problems that the number of capillaries increases as the number of air holes increases, which degrades economic efficiency and processing accuracy and makes the manufacture difficult to carry out.

(ii) Drilling Method

This method is described in NPL 3. In this method, unevenness called a crushed layer containing impurities is generated on the inner surface of the air hole, which may cause an increase of loss. In addition, there is no denying that there is a possibility that the parent material itself is broken during drilling operation. Thus, in this method as well, there are problems of economic efficiency and processing accuracy being degraded as the number of air holes increases and it is difficult to prevent degradation in characteristics of the fiber produced from occurring.

In other words, it may be said that the HAF having a smaller number of air holes than the PCF has an advantage in manufacturing. However, the HAF has a problem as follows. The transmission fiber is required to have a low loss property over the entire region of the wavelength band to be used. Here, it is reported that Rayleigh scattering loss increases in accordance with the amount of dopant in a core (for example, see NPL 4). In other words, there exists Rayleigh scattering loss in an HAF having the core that is formed using dopant, and the problem is how to reduce the Rayleigh scattering loss.

Thus, an object of the present invention is to provide an HAF having a structure in which the number of air holes is decreased to be smaller than that of a PCF to make it is possible to reduce Rayleigh scattering loss more than the existing HAF, in order to solve the problems of the PCF and HAF.

Means for Solving the Problem

In order to achieve the object described above, an HAF according to the present invention employs a hybrid structure of the existing HAF and PCF.

Specifically, a hole-assisted fiber (HAF) according to the present invention includes: a core portion having a uniform optical refractive index;
a cladding portion having a uniform optical refractive index and surrounding the core portion; and
a plurality of air holes arranged in two layers at positions configuring hexagonal closest packing excluding the core portion within the cladding portion along a longitudinal direction of the hole-assisted fiber,
wherein a center-to-center spacing of the air holes is a sum of a radius Rin of an inscribed circle inscribed in the air holes in an inner layer and a radius d/2 of the air hole, and a radius "a" of the core portion and a relative refractive index difference Δ between the core portion and the cladding portion are present within a range where Rn, which is a ratio of a Rayleigh scattering coefficient Rsmf of a single mode optical fiber and an effective Rayleigh scattering coefficient Reff of the hole-assisted fiber, is equal to or less than 0.92.

The HAF has air holes arranged in two layers, and the number of air holes is larger than that of the existing HAF but smaller than that of the existing PCF. In addition, since the HAF has a core radius and a relative refractive index difference such that a normalized Rayleigh scattering coefficient Rn is less than or equal to 0.92, Rayleigh scattering loss may be more reduced than that in a single mode optical fiber. Accordingly, the present invention is able to provide an HAF having a structure in which the number of air holes is decreased to be smaller than that of the PCF and Rayleigh scattering loss may be more reduced than that in the existing HAF.

A mode field diameter 2w of a fundamental mode at a wavelength of 1310 nm of the HAF according to the present invention is in a range of 7.8 μm or more and 9.2 μm or less, or of 9.3 μm or more and 11.7 μm or less.

In the HAF according to the present invention, Rin/a is equal to or greater than three.

In a cross-section of the hole-assisted fiber according to the present invention, an air hole occupancy ratio S, which is a ratio of an area of all of the air holes to an area of a ring-shaped region that is formed by the above-described inscribed circle and a circumscribed circle with a radius Rout circumscribing the air holes in an outer layer, is represented by an expression of 0.001×exp(Rin/a/1.66)+ 0.19≤S≤−9.60×exp(−Rin/a/0.65)+0.30.

In the HAF according to the present invention,
in a case where a reference optical fiber in which the above-mentioned air holes are not present and a structure other than the air holes is identical to the structure of the hole-assisted fiber is assumed, a mode field diameter of the hole-assisted fiber is 84% or more as large as a mode field diameter of the reference optical fiber, and
the mode field diameter of the reference optical fiber is in a range of 10.3 or more and 12.0 or less in a case where a V value of the reference optical fiber is in a range of 1.25 or more and 1.76 or less, or the mode field diameter of the reference optical fiber is in a range of 12.3 or more and 13.6 or less in a case where the V value of the reference optical fiber is in a range of 1.17 or more and 1.32 or less.

Note that each of the inventions described above can be combined with each other to the extent possible.

Effects of the Invention

The present invention is able to provide an HAF having a structure in which the number of air holes is decreased to be smaller than that of the PCF and Rayleigh scattering loss may be more reduced than that in the existing HAF.

DESCRIPTION OF EMBODIMENTS

Embodiments of the present invention will be described with reference to the accompanying drawings. The embodiments described below are examples of the present invention and the present invention is not limited to the embodiments described below. Note that constituent elements with the same reference signs in the specification and the drawings are assumed to be the same constituent elements.

Figure 1:
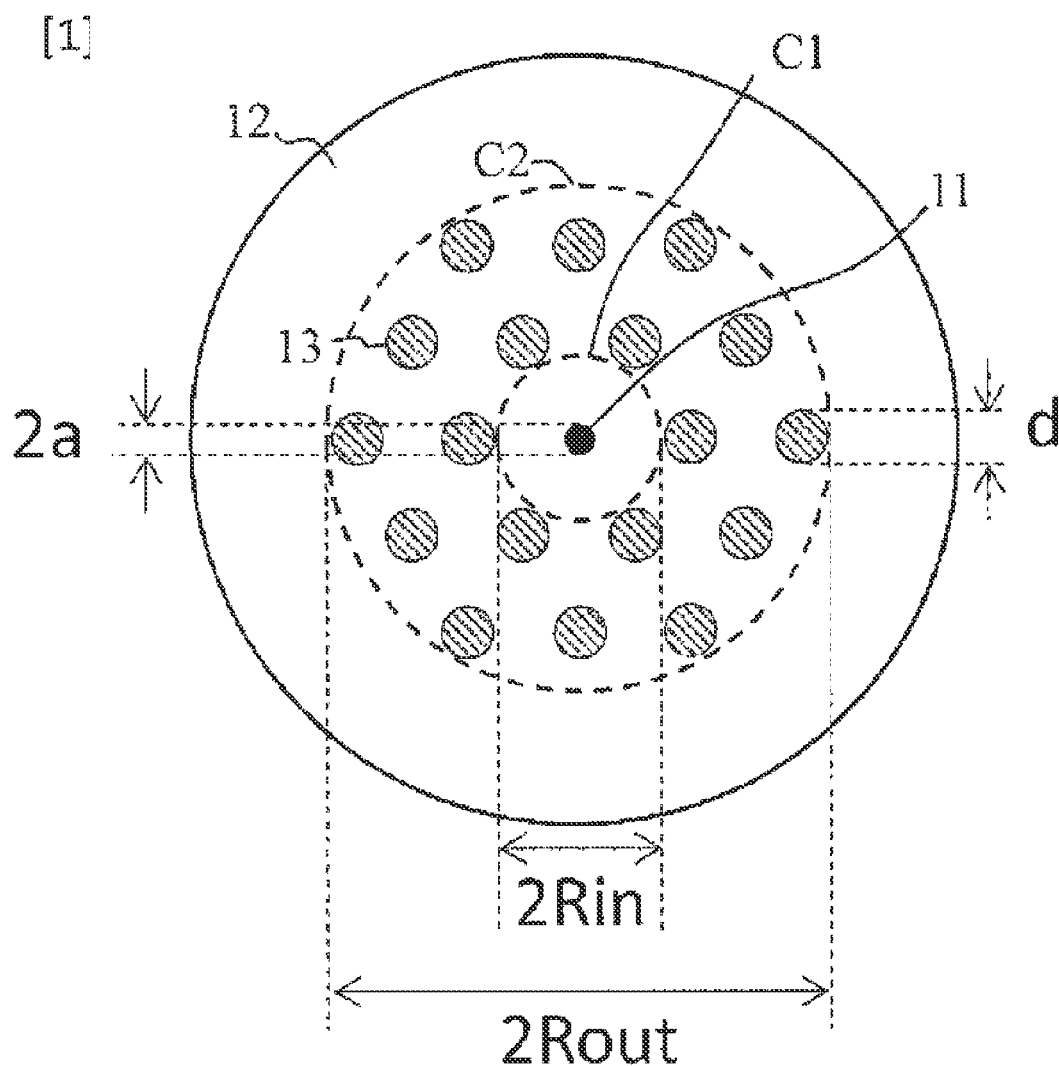
FIG. 1 is a diagram for explaining a structure of a hole-assisted fiber according to the present invention.

FIG. 1 is a diagram for explaining a cross-sectional structure of an HAF of the present embodiment. The HAF includes a core portion 11 having a uniform optical refractive index; a cladding portion 12 having a uniform optical refractive index and surrounding the core portion 11; and a plurality of air holes 13 arranged in two layers at positions configuring hexagonal closest packing excluding the core portion 11 within the cladding portion 12 along a longitudinal direction of the optical fiber.
Note that in the present specification, a case is described in which the air holes are arranged at the positions configuring hexagonal closest packing, but the air holes may be arranged differently as long as the air holes are arranged within a range of an air hole occupancy ratio S to be described below.

The core portion 11 is located in the center of the HAF and has a radius "a". In the cladding portion 12, N air holes 13 each having a diameter d are arranged in two layers in a hexagonal closest structure (one cell structure) excluding the core portion 11. N is equal to 18 in the present example, where six air holes 13 are arranged in an inner layer while 12 air holes 13 are arranged in an outer layer. An air hole occupancy ratio S in a region obtained by excluding an inscribed circle C1 of the air holes 13 in the inner layer from a circumscribed circle C2 of the air holes 13 in the outer layer is represented by Equation 1.

$$S = N \times (d/2)^2 / (Rout^2 - Rin^2) \quad \text{[Equation 1]}$$

Note that Rin is the radius of the inscribed circle C1 and Rout is the radius of the circumscribed circle C2.

A center-to-center spacing t of the air holes 13 is a sum of a radius Rin of the inscribed circle C1 inscribed with respect to the air holes 13 in the inner layer and a radius d/2 of the air hole 13.

$$t = Rin + d/2 \quad \text{[Equation 2]}$$

Figure 3:
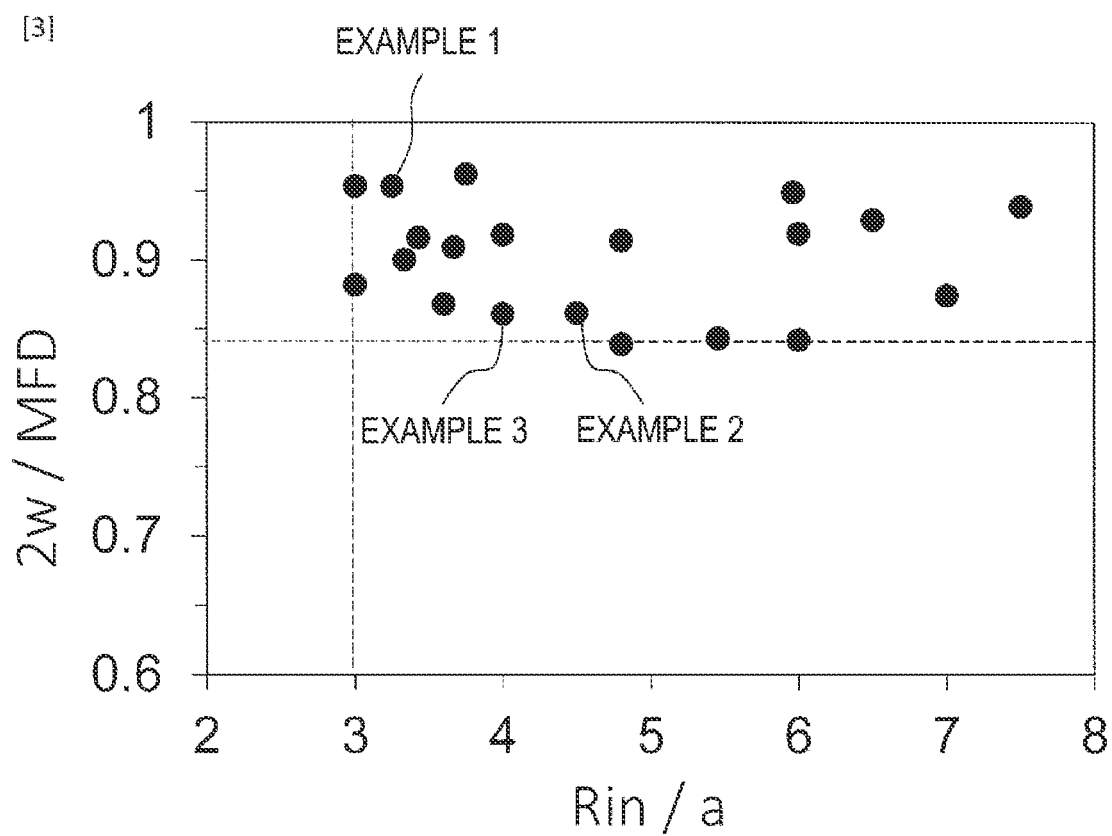
FIG. 3 is a diagram for explaining characteristics of a hole-assisted fiber according to the present invention.
Figure 4:
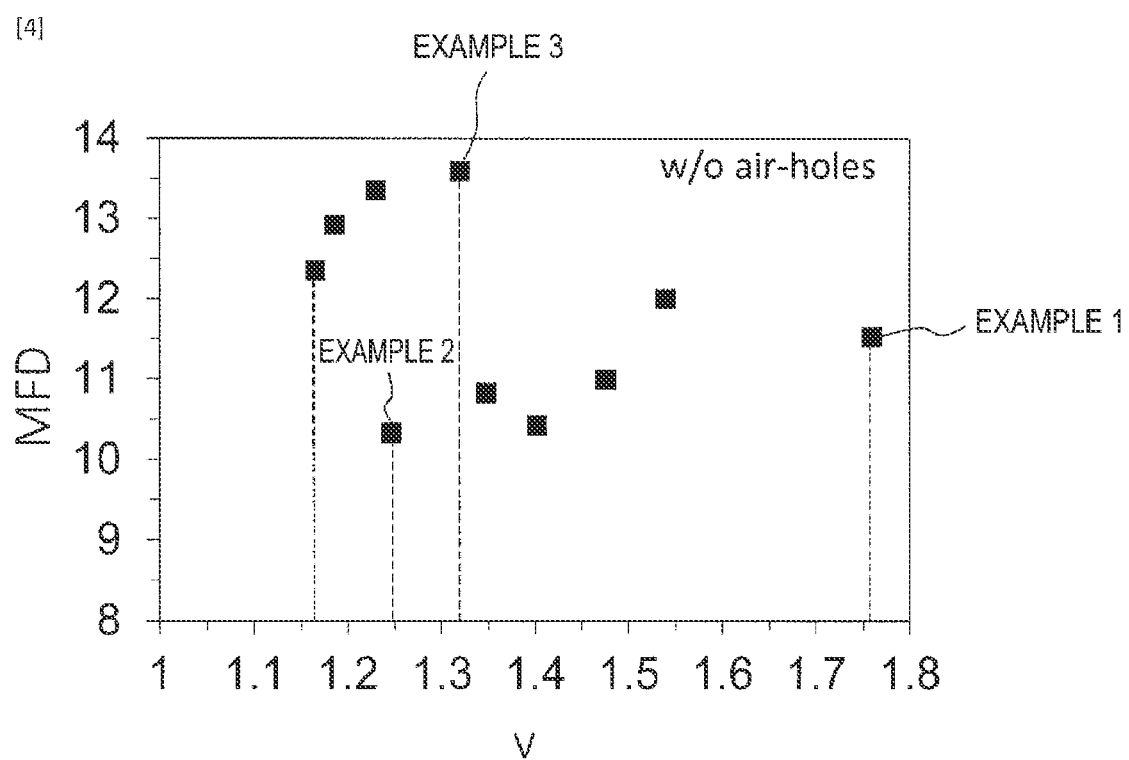
FIG. 4 is a diagram for explaining characteristics of a hole-assisted fiber according to the present invention.

In the HAF, the radius a of the core portion and a relative refractive index difference Δ between the core portion and the cladding portion are present within a range where Rn, which is a ratio of a Rayleigh scattering coefficient Rsmf of a single mode optical fiber and an effective Rayleigh scattering coefficient Reff of the hole-assisted fiber, is equal to or less than 0.92. To determine the core radius a of the HAF and the relative refractive index difference Δ between the core portion 11 and cladding portion 12, graphs in FIGS. 2 to 4 are used.

Figure 2:
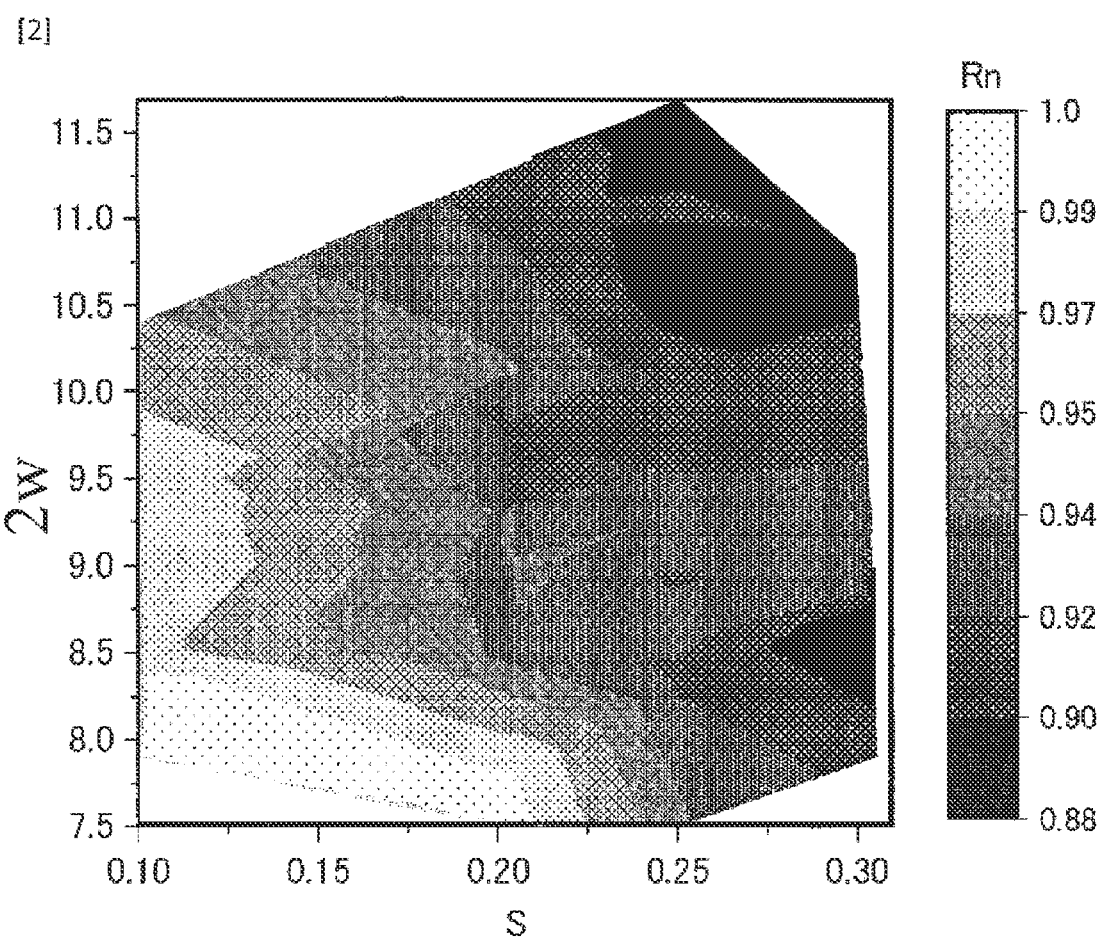
FIG. 2 is a diagram for explaining characteristics of a hole-assisted fiber according to the present invention.

FIG. 2 is a diagram illustrating a relationship of the air hole occupancy ratio S, a mode field diameter 2w at a wavelength of 1310 nm, and a normalized Rayleigh scattering coefficient Rn. A procedure of obtaining the graph in FIG. 2 is described below. First, while varying core parameters in FIG. 1 (the radius a and the relative refractive index difference Δ) in a range of 1.5<a<5 (μm) and 0.1<Δ<0.4 and also varying air hole parameters (the radius Rin of the inscribed circle C1 and the air hole occupancy ratio S) in a range of 3<Rin<65 (mm) and 0.1<S<0.4, cutoff wavelengths, bending loss, and confinement loss of all combinations of the parameters are calculated (see NPL 5, in which a method for calculating the mode field diameter (2w), cutoff wavelength, bending loss, and confinement loss with four parameters (a, Δ, Rin, and S) is described).

Subsequently, the calculated cutoff wavelengths, bending loss, and confinement loss are compared with each requirement described below to extract a parameter group PG satisfying all of the requirements from all the parameters, and the extracted parameter group PG is plotted on a graph where the horizontal axis represents the air hole occupancy ratio S while the vertical axis represents the mode field diameter 2w.

The requirements are as follows.
(1) Cutoff wavelength: bending loss of a first high order mode of a 1260 nm wavelength is 1 dB/m or more when a bending radius is 140 mm.
(This requirement is set to allow the propagation of a fundamental mode of the 1260 nm wavelength)
(2) Bending loss: bending loss of a fundamental mode of a 1625 nm wavelength at a bending radius R of 30 mm is 0.5 dB/100 turns or less.
(3) Confinement loss: confinement loss is $1 \times 10^{-6}$ dB/m or less at a 1550 nm wavelength (fundamental mode).

Furthermore, for each parameter included in the parameter group PG, the effective Rayleigh scattering coefficient Reff is calculated from an electric field amount applied to the core portion using the mode field diameter 2w when the air holes are given. Note that the electric field amount applied to the core portion is determined from the structure and the wavelength. The calculation method uses an equation described below in which a calculation equation for the Rayleigh scattering coefficient that depends on the dopant concentration described in NPL 4 is multiplied by the electric field amount applied to the core portion.

$$Reff = 0.8 + 0.50[GeO_2] - 0.50[GeO_2]\exp(2a^2/(MFD/2)^2) \quad \text{[Equation 3]}$$

Note that [GeO₂] means Δ of the dopant concentration. Then, the normalized Rayleigh scattering coefficient Rn for each parameter is calculated by an equation of Rn=Reff/Rsmf from the calculated effective Rayleigh scattering coefficient Reff and the Rayleigh scattering coefficient Rsmf (equals to 0.89) of a single mode fiber (SMF) such as G.652B, 652D or the like of ITU-T. The calculated normalized Rayleigh scattering coefficient Rn is displayed on the parameter group PG. The procedure of obtaining the graph in FIG. 2 has been described above.

Note that the normalized Rayleigh scattering coefficient Rn has the following meanings. When the Rayleigh scattering loss can be reduced by 0.02 dB/km compared to the SMF at a wavelength of 1310 nm, Rn is equal to 0.92. Note that Rn of pure quartz glass is 0.85.

Even when dopant is contained as in an HAF, a low loss property may be achieved with a structure capable of making the Rn approach 0.85. Accordingly, in the present embodiment, it is intended to find a structure in which the normalized Rayleigh scattering coefficient Rn is 0.92 or less. Then, it may be understood from FIG. 2 that there exist parameters that bring a relation of Rn≤0.92 in a region where the air hole occupancy ratio S is greater than or equal to 0.2 and the mode field diameter 2w is 9.6 to 11.7 μm, and in a region where the air hole occupancy ratio S is greater than or equal to 0.25 and the mode field diameter 2w is 7.8 to 9.2 μm.

FIG. 3 is a diagram for explaining a lower limit of Rin/a in a low Rn region. For each parameter included in the parameter group PG, 2w/MFD is calculated and plotted on a graph where the horizontal axis represents Rin/a while the vertical axis represents 2w/MFD. Note that the "low Rn region" refers to a region of Rn≤0.92. In a case of being 0.92 or less compared to the Rayleigh scattering coefficient of the SMF, it is possible to reduce the transmission loss at a wavelength of 1550 nm by 0.02 dB/km or more.

Here, Rin/a is a parameter that directly determines an effect of the air holes on MFD (for example, see NPL 5). For example, when Rin/a becomes smaller, 2w is reduced and the effect of the increase in loss due to unevenness of the air hole interface becomes apparent. In addition, "2w" represents the mode field diameter of the present HAF, and "MFD" represents the mode field diameter of a "reference optical fiber" with no air hole 13 in the structure illustrated in FIG. 1. In other words, "2w/MFD" refers to a mode field diameter reduction rate when the air holes 13 are given to the reference optical fiber.

From FIG. 2, it may be understood that each parameter included in the parameter group PG is present within a region of Rin/a≥3 and 2w/MFD≥0.84.

FIG. 4 is a diagram for explaining a v value in the low Rn region. The wavelength is 1310 nm. The horizontal axis represents the v value of the reference optical fiber while the vertical axis represents the mode field diameter MFD of the reference optical fiber. A relationship between the v value of the reference optical fiber (step type optical fiber) and the mode field diameter MFD may be represented by Equation 4. Equation 4 is an empirical equation described in NPL 5.

$$MFD/2 = a \times (0.65 + 1.619v^{-1.5} + 2.879v^{-6}) \quad \text{[Equation 4]}$$

The v value is determined by the core radius a, a refractive index $n_1$ of the core portion, and the relative refractive index difference Δ.

$$v = (2\pi a n_1 \sqrt{(2\Delta)})/\lambda \quad \text{[Equation 5]}$$

FIG. 4 is a graph in which the v value and the MFD are calculated and plotted using Equation 3 and Equation 4 for each parameter included in the parameter group PG. From FIG. 4, the following may be recognized. There are two parameter groups; one of them is a parameter group in which the MFD becomes 10.3 to 12.0 when the v value of the reference optical fiber is 1.25 to 1.76, and the other one is a parameter group in which the MFD becomes 12.3 to 13.6 when the v value is 1.17 to 1.32.

Figure 6:
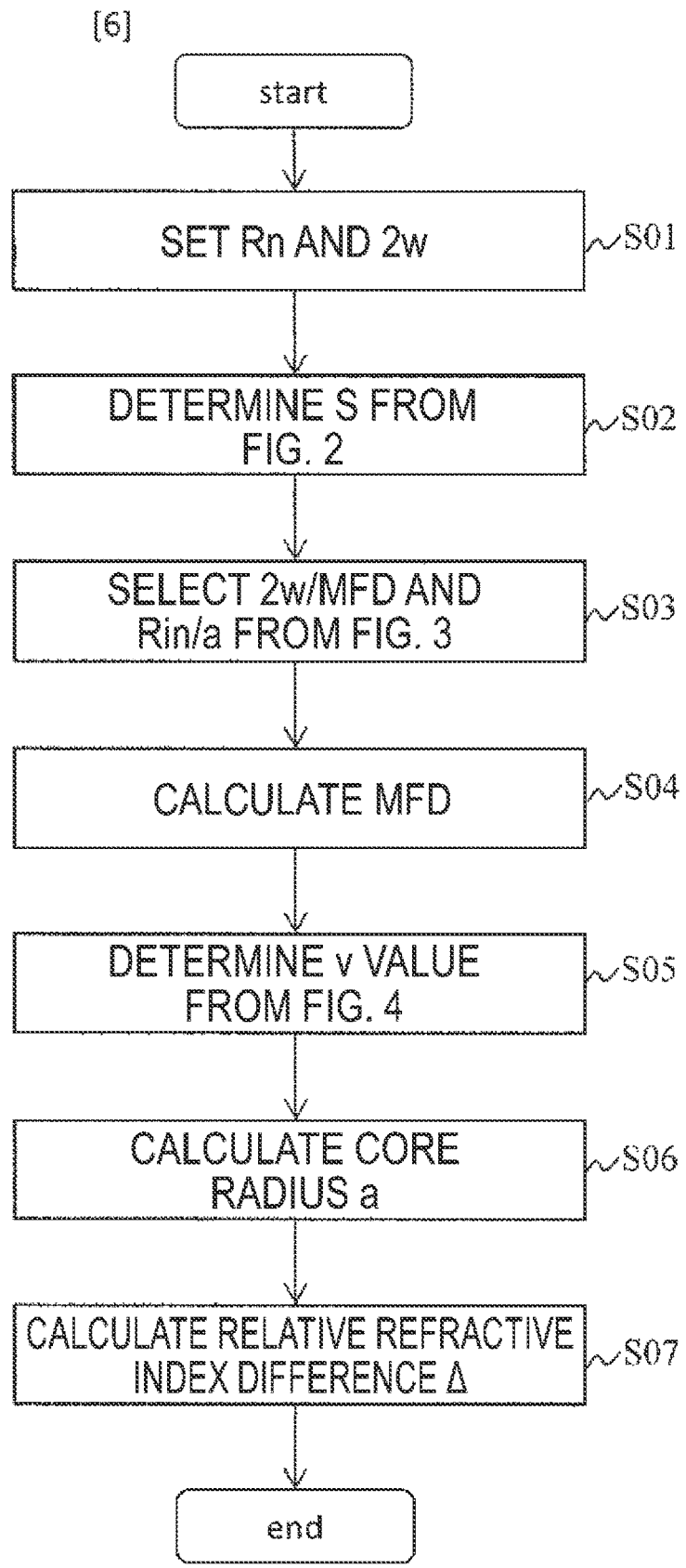
FIG. 6 is a diagram for explaining a method for designing a hole-assisted fiber according to the present invention.

FIG. 6 is a flowchart illustrating a design method for determining the structure of an HAF. The design method determines a core radius "a" and a relative refractive index difference Δ of the HAF by using FIGS. 2 to 4.

First, for specifications of the HAF, a normalized Rayleigh scattering coefficient Rn and a mode field diameter 2w are determined (step S01). Rn is approximately 0.92, and 2w is determined from a connection target device or the like of the HAF.

Subsequently, a range of an air hole occupancy ratio S satisfying the Rn and 2w is detected from FIG. 2 (step S02).

Then, any parameter is selected from the parameters included in the range of the S, and Rin/a and 2w/MFD are detected from FIG. 3 (step S03).

The MFD is calculated from the detected 2w/MFD and the 2w determined in step S01 (step S04), and a v value corresponding to the MFD is detected from FIG. 4 (step S05).

The MFD and the v value are substituted into Equation 4 to calculate the core radius a (step S06). Furthermore, the calculated core radius a, the v value, a desired wavelength λ (equals to 1310 nm), and a refractive index $n_2$ of the cladding portion (1.455, which is a refractive index of quartz) is substituted into Equation 5 to calculate the relative refractive index difference Δ (step S07).

A specific design example will be described below.

Example 1

It is considered to design an HAF with low Rayleigh scattering loss capable of propagating single mode light at a wavelength of 1260 nm to 1625 nm. The HAF structure is the same as that in FIG. 1. The design is carried out in such a manner that Rn is 0.92 or less, and 2w is 11 μm at a 1310 nm wavelength.

From FIG. 2, a relationship of (S, 2w, Rn)=(0.2, 11, 0.92) may be selected. Under this condition, from FIG. 3, a relationship of Rin/a=3.3 is selected to suppress the effect of the loss increase due to unevenness of the air hole interface, and a relationship of 2w/MFD=0.95 is selected to suppress the reduction rate to be 5% from the MFD accompanying the provision of the air holes. At this point of time, air hole parameters (Rin/a and S) may be determined. At this time, from 2w and 2w/MFD, the MFD is 11.5 when there is no air hole (reference optical fiber). From FIG. 4, the v value that satisfies this condition is 1.76. A combination of the core radius a and the relative refractive index difference Δ that satisfies the MFD and v value may be calculated by Equation 4 and Equation 5, and core parameters may be determined to have a relationship of (a, Δ)=(4, 0.2). By designing in the manner described above, an HAF capable of reducing Rn to 0.92 may be designed.

Example 2

It is considered to design an HAF with low Rayleigh scattering loss capable of propagating single mode light at a wavelength of 1260 nm to 1625 nm. The HAF structure is the same as that in FIG. 1. The design is carried out in such a manner that Rn is 0.92 or less, and 2w is 8.9 μm at a 1310 nm wavelength.

From FIG. 2, a relationship of (S, 2w, Rn)=(0.25, 8.9, 0.92) may be selected. Under this condition, from FIG. 3, a relationship of Rin/a=4.5 is selected to suppress the effect of the loss increase due to the unevenness of the air hole interface, and a relationship of 2w/MFD=0.86 is selected to suppress the reduction rate to be 14% from the MFD accompanying the provision of the air holes. At this point of time, air hole parameters (Rin/a and S) may be determined. At this time, from 2w and 2w/MFD, the MFD is 10.3 when there is no air hole (reference optical fiber). From FIG. 4, the v value that satisfies this condition is 1.25. A combination of the core radius a and the relative refractive index difference Δ that satisfies the above MFD and v value may be calculated by Equation 3 and Equation 4, and core parameters may be determined to have a relationship of (a, Δ)=(2, 0.4). By designing in the manner described above, the HAF capable of reducing Rn to 0.92 may be designed.

Example 3

It is considered to design an HAF with low Rayleigh scattering loss capable of propagating single mode light at a wavelength of 1260 nm to 1625 nm. The HAF structure is the same as that in FIG. 1. The design is carried out in such a manner that Rn is 0.89 or less, and MFD is 11.7 μm at a 1310 nm wavelength.

From FIG. 2, a relationship of (S, 2w, Rn)=(0.25, 11.7, 0.89) may be selected. Under this condition, from FIG. 3, a relationship of Rin/a=4 is selected to suppress the effect of the loss increase due to the unevenness of the air hole interface, and a relationship of 2w/MFD=0.86 is selected to suppress the reduction rate to be 14% from the MFD accompanying the provision of the air holes. At this point of time, air hole parameters (Rin/a and S) may be determined. At this time, from 2w and 2w/MFD, the MFD is 13.6 when there is no air hole (reference optical fiber). From FIG. 4, the v value that satisfies this condition is 1.32. A combination of the core radius a and the relative refractive index difference Δ that satisfies the MFD and v value may be calculated by Equation 3 and Equation 4, and core parameters may be determined to have a relationship of (a, Δ)=(3, 0.2). By designing in the manner described above, the HAF capable of reducing Rn to 0.89 may be designed.

Figure 5:
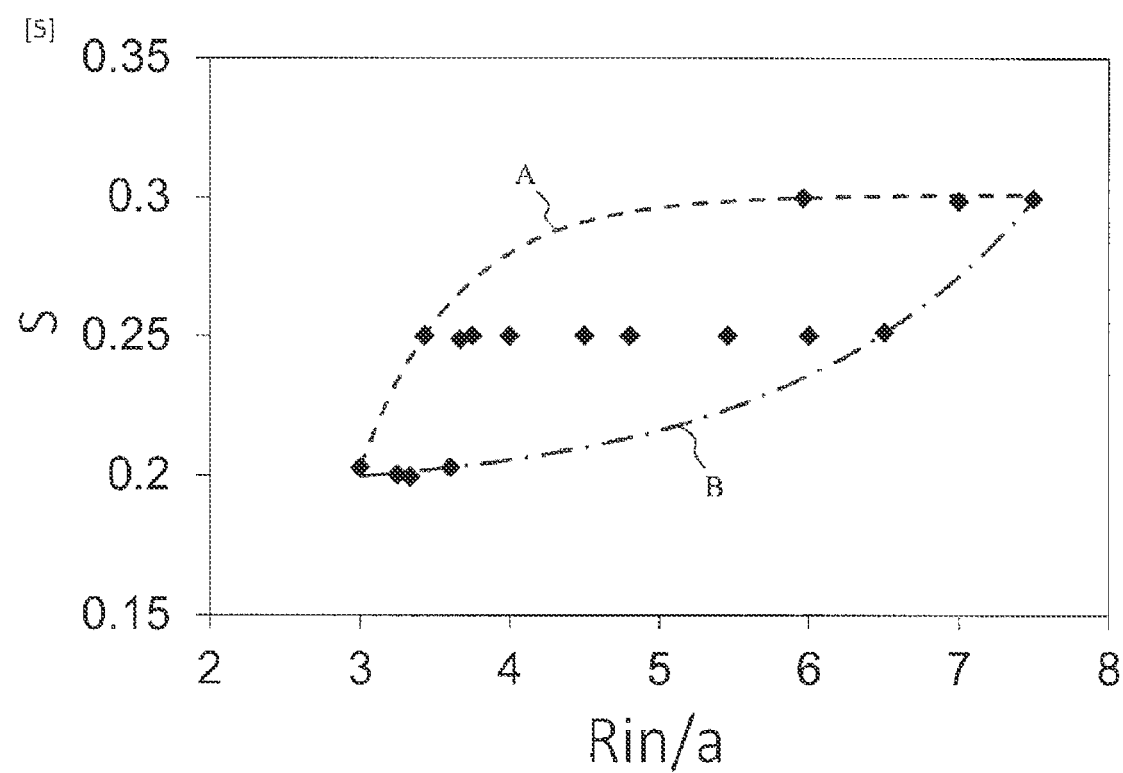
FIG. 5 is a diagram for explaining characteristics of a hole-assisted fiber according to the present invention.

An HAF of Rn≤0.92 may be designed from the parameter group PG as in Example 1 to Example 3. FIG. 5 is a graph on which the above-discussed Rin/a and S of the HAF are plotted. From FIG. 5, it may be understood that the HAF of Rn≤0.92 is present in a range surrounded by a curved line A and a curved line B. Thus, in a case of an HAF of the structure having the air hole occupancy ratio S, core radius a, and inscribed circle Rin of the air holes that are plotted in the range surrounded by the curved line A and the curved line B, it is possible to achieve a relation of Rn≤0.92 even in the HAF in which 10 air holes are arranged in a ring shape in such a manner that, for example, the number of air holes in the first layer is 10 and the number of air holes in the second layer is 10, regardless of the hexagonal closest structure.

Curved line A: $-9.60 \times \exp(-Rin/a/0.65)+0.30$

Curved line B: $0.001 \times \exp(Rin/a/1.66)+0.19$

Effects of the Invention

The present invention provides an HAF structure where Rayleigh scattering loss is low over a wide wavelength region and the number of air holes is reduced to enhance manufacturability. In the present invention, a hybrid structure of the existing HAF and PCF is used. By at least one of a reduction in the core radius of the existing HAF (a reduced core) and a reduction in the relative refractive index difference Δ of the core (a reduced Δ), the Rayleigh scattering loss by the core is suppressed. In order to suppress increases in the confinement loss, bending loss, and the like of the optical fiber due to the reduced core and reduced Δ of the HAF, air holes are arranged in two layers.

In other words, the present invention intends to provide a core to suppress the increase in loss due to the impurities entering into the inner surface during the production, the unevenness, or the like, which is a problem of the existing PCF, and intends to achieve the reduced core or reduced Δ to suppress Rayleigh scattering loss derived from the core, which is a problem of the HAF.

As for the increase in loss due to the impurities entering into the inner surface during the production, the unevenness, or the like, which is a problem of the PCF, achieving the reduced core or reduced Δ makes it possible to confine the light with both the core and a small number of air holes, so that it is possible to enhance the manufacturability by suppressing the increase in loss during the production and reducing the number of air holes.

Rin/a, which is expressed by using the radius Rin of the air hole inscribed circle and the core radius a, is a parameter that directly determines the effect of the air holes on the MFD (NPL 5), and when Rin/a decreases, the effect of the loss increase by the air hole interface becomes noticeable in addition to the MFD reduction. In the present invention, by using the hybrid structure of the existing HAF and PCF, there is provided an HAF structure where Rayleigh scattering loss is low over a wide wavelength region, and the number of air holes is reduced to enhance the manufacturability. In the HAF of the present invention, Rin/a expressed by using the radius Rin of the inscribed circle C1 and the core radius a is three or greater, and the reduction rate of the MFD accompanying the provision of the air holes is at least 84%.

INDUSTRIAL APPLICABILITY

The HAF of the present invention may be applied to optical fibers for communication that utilize a wavelength division multiplexing (WDM) technique using a large number of multiple pieces of signal light having different wavelengths, a multi-level modulation technique, and the like.

REFERENCE SIGNS LIST

11 Core portion
12 Cladding portion
13 Air hole

The invention claimed is:
1. A hole-assisted fiber comprising:
a core portion having a uniform optical refractive index, the core portion having a radius a;
a cladding portion having a uniform optical refractive index, the cladding portion being radially divided into first, second, and third ring-shaped layers, the first ring-shaped layer circularly surrounding the core portion, the second ring-shaped layer circularly surrounding the first ring-shaped layer, the third ring-shaped layer circularly surrounding the second ring-shaped layer; and
a plurality of air holes arranged only in the second ring-shaped layer along a longitudinal direction of the hole-assisted fiber, each of the plurality of air holes having a diameter d that is larger than a diameter 2a of the core portion, wherein
a center-to-center spacing between adjacent two air holes of the plurality of air holes is a sum of a radius Rin of an outer circumference of the first ring-shaped layer inscribing air holes of the plurality of air holes and a radius d/2 of an air hole of the plurality of air holes,
an outer circumference of the second ring-shaped layer circumscribes the air holes of the plurality of air holes,
Rin/a is in a range of 3 to 7.5,
in a cross section of the hole-assisted fiber, an air hole occupancy ratio S is represented by an expression of $0.001 \times \exp(Rin/a/1.66) + 0.19 \leq S \leq -9.60 \times \exp(-Rin/a/0.65) + 0.30$, and
the air hole occupancy ratio S is a ratio of a sum of areas of the plurality of air holes to an area of the second ring-shaped layer.
2. The hole-assisted fiber according to claim 1, wherein a mode field diameter 2w of a fundamental mode at a wavelength of 1310 nm ranges from 7.8 μm to 9.2 μm, or from 9.3 μm to 11.7 μm.
3. The hole-assisted fiber according to claim 1, wherein the plurality of air holes are arranged in two layers at positions configuring hexagonal closest packing.

* * * * *